Jan. 13, 1931.                R. K. LEE                1,788,878
                           ENGINE MOUNTING
                         Filed Sept. 16, 1927

INVENTOR
ROGER K. LEE.
BY
       ATTORNEY

Patented Jan. 13, 1931

1,788,878

UNITED STATES PATENT OFFICE

ROGER K. LEE, OF DETROIT, MICHIGAN, ASSIGNOR TO CHRYSLER CORPORATION, OF HIGHLAND PARK, MICHIGAN, A CORPORATION OF DELAWARE

ENGINE MOUNTING  REISSUED

Application filed September 16, 1927. Serial No. 220,027.

This invention relates to engine mountings and more particularly to the mounting of an internal combustion engine in an automobile frame.

It is well known that rotation of the crankshaft of an internal combustion engine causes a periodic vibration due to the torque or twisting action of the shaft. This vibration or vertical movement is usually transmitted to the frame and thus causes objectionable noise in the parts associated with the engine. It is therefore a primary object of my invention to provide an engine mounting whereby the torque action may be absorbed by a frame connection independent of the weight supporting member.

A further object of my invention is to provide an engine mounting in which the weight of the engine may be supported by a resilient member and an independent resilient member provided for the absorption of the torque action.

With the above and other objects in view, my invention consists in the arrangement, combination and construction of the various parts of my improved device as described in the specification, claimed in my claims and shown in the accompanying drawings, in which:

Figure 1:
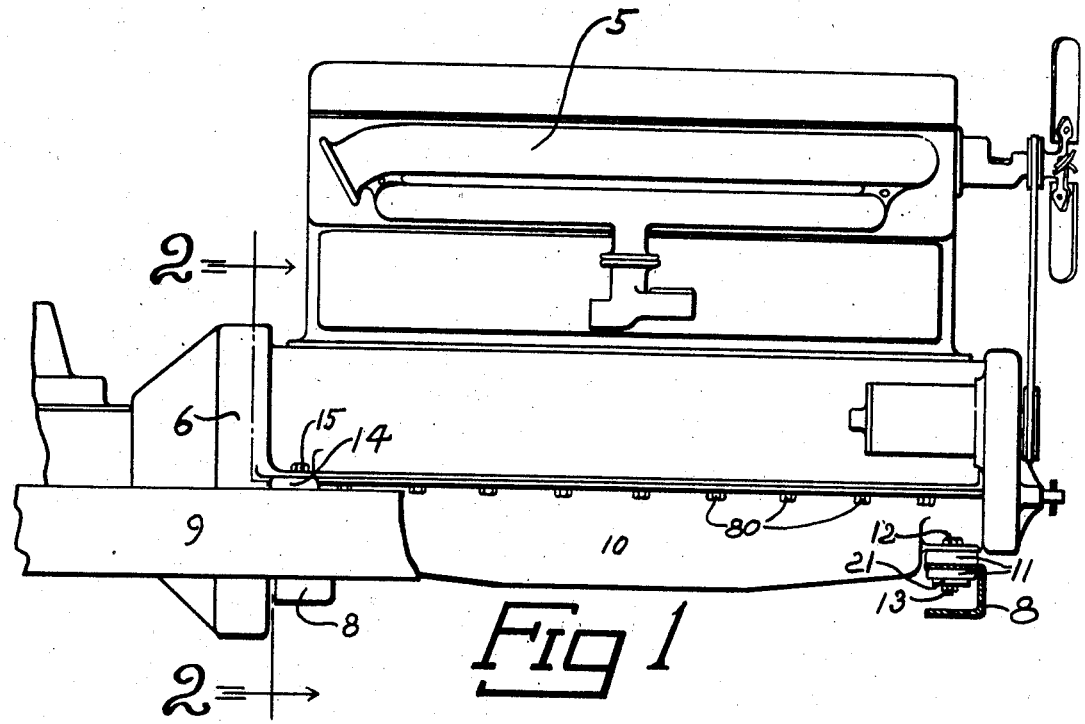
Fig. 1 is a side elevation of an internal combustion engine mounted in an automobile frame in accordance with my invention.
Figure 2:
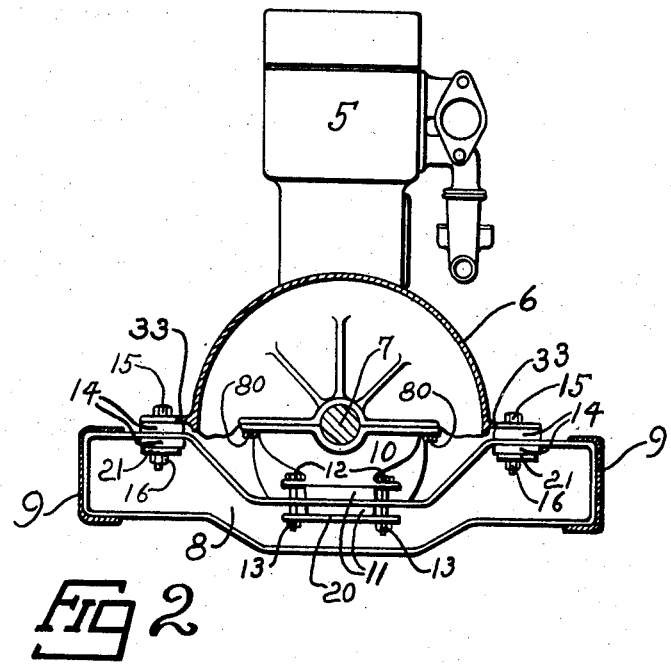
Fig. 2 is a sectional view taken on line 2—2 of Fig. 1.

I have shown an internal combustion engine indicated generally at 5 having a flywheel housing 6 at the rear end thereof. Bolted at 80 to the engine casing is a crankcase 10 within which is positioned the crankshaft 7.

Conventional side channel members of an automobile frame are shown as at 9, between which are positioned, at front and rear, channel shaped supporting cross members 8.

The crankcase 10 is supported at the centers of the front cross members 8 by means of two rubber blocks 11 positioned on either side of one flange of the cross member, between the bottom of the crankcase and the supporting plate 20, respectively. The blocks are loosely secured in place by means of bolts 12 and nuts 13, so as to permit slight movement thereof when the structure is in motion. It will be noted that the entire weight of the motor is carried at this point, in the front and rear, and that the resilient support will tend to absorb any slight vibration which may be present.

The housing 6 is provided with flanges 33 at each side thereof and resilient means, such as rubber blocks 14 are mounted on either side of a flange of the cross member between the flanges 33 and plates 21 respectively. The blocks 14 are loosely secured in place by means of bolts 15 and nuts 16. A slight looseness is desirable to permit vertical movement of the blocks in absorbing the engine vibration.

It will thus be apparent that the weight of the engine is carried entirely by the central portions of the cross members 8 thru the rubber blocks 11, and that the blocks 14 are utilized for the purpose of absorbing the vertical movement or torque reaction caused by rotation of the crankshaft 7. This results in an engine mounting which is exceptionally quiet, as well as one in which the vibration is successfully eliminated independently of the load carrying member.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, an internal combustion engine, side frame members therefor, cross members connecting said side members, resilient blocks on said cross members for supporting the weight of said engine, and resilient blocks positioned on either side of said engine for absorbing periodic vibrations of said engine.

2. In an engine mounting of the class described, an internal combustion engine, a supporting frame therefor consisting of side members and connection cross members, resilient weight supporting blocks positioned in substantially the center of each of said cross members, and resilient means on either side of said engine for absorbing periodic vibrations of said engine.

3. In an engine mounting of the class described, an internal combustion engine, side frame members therefor, cross members connecting said side members, means on certain of said cross members for supporting the weight of said engine, and resilient blocks independent of said weight supporting means for absorbing the torque action of said engine by the compression of said blocks.

4. In an engine mounting of the class described, an internal combustion engine, side frame members therefor, cross members connecting said side members, rubber blocks positioned in substantially the center of certain of said cross members for suporting the weight of said engine, and rubber blocks positioned on either side of said first mentioned blocks for absorbing vibrations of said engine.

5. In an engine mounting of the class described, an internal combustion engine, side frame members therefor, two cross members connecting said side members at front and rear of said engine, rubber blocks positioned in substantially the center of each of said cross members, for suporting the weight of said engine, and rubber blocks positioned on either side of each of said first mentioned blocks for absorbing torque vibrations of said engine.

6. In combination, an internal combustion engine, side frame members therefor, cross members connecting said side members, means at the center on certain of said cross members for supporting the weight of said engine, and means adjacent the opposite ends of said cross members for absorbing the torsional vibration of said engine.

7. In combination, an internal combustion engine, side frame members therefor, cross members connecting said side members, resilient means on the upper face of certain of said cross members for supporting the weight of said engine, and resilient means on the upper face of said cross members adjacent the opposite ends of said cross members in engagement with said engine, for absorbing torsional vibration.

8. In combination, an internal combustion engine having lateral projections adjacent its rear end, side frame members, cross members connecting said side members adjacent the opposite ends of said engine, a resilient supporting member on each of said cross members adapted to support the engine at its opposite ends on a vertical line through the center of said engine, and resilient blocks between one of said cross members and the lateral projections of said engine.

ROGER K. LEE.